Nov. 4, 1969

M. F. KLINE 3,475,885

RETAINER FOR PURIFICATION MEDIA FOR
GAS FROM SEWER LINE VENTS

Filed May 2, 1968

INVENTOR
MILLARD F. KLINE
BY
Mason, Mason & Albright
ATTORNEYS

United States Patent Office 3,475,885
Patented Nov. 4, 1969

3,475,885
RETAINER FOR PURIFICATION MEDIA FOR GAS
FROM SEWER LINE VENTS
Millard F. Kline, 138 Bedford St.,
Cumberland, Md. 21502
Filed May 2, 1968, Ser. No. 726,105
Int. Cl. B01d 47/02
U.S. Cl. 55—357
2 Claims

ABSTRACT OF THE DISCLOSURE

A retainer for a purifying agent to purify gases escaping from sewer line vent pipes wherein the purifying agent is retained in an annular space around the vent pipe and the path escaping gases must travel is initially downward alongside the pipe into the purifying medium contained in the annular space, then is upward through the purifying medium and finally is through outlet openings in the retainer to the atmosphere; there being a cap disposed on the top of the retainer to shield it from the elements. In one embodiment, the unit carrying the purifying medium is supported by but not connected to the container and is adaptable for easy replacement. In the other embodiment the purifying medium is liquid which can be replenished through a fitting on the container.

Background of the invention

The invention relates to a retainer for a purifying medium for use on vent pipes of sewers and the like for purifying gases discharging from sewer pipes before they escape into the atmosphere.

In the usual installation of a sewage system in buildings such as houses, vent pipes are provided which extend vertically through the roof with an outlet on their upper end from which germs and other impurities may readily pass. In densely populated areas a significant volume of polluting agents are thus admitted into the atmosphere. This can be readily observed on a cold day since gases emitted from vent pipes tend to form a condensation which is readily observable. This danger has been recognized for over a half a century, as noted in U.S. Patent No. 1,230,473, issued June 19, 1917 to Arthur C. Freeman, Jr. Attention is also invited to U.S. Patent No. 1,383,938, issued July 5, 1921 to N. R. Hageman. However, the often inaccessible location of the vent pipes has discouraged utilization of a filtration means therefor. Still further, solutions which have been suggested to overcome the problem have not provided a comparatively simple apparatus wherein the filtration medium is disposed relative to the escaping gases from the vent for efficient utilization and to obtain the maximum use of the purifying medium without the necessity of frequent replacement, or wherein replacement can be conveniently effected when required.

Summary of the invention

My solution to the above problems is a retainer which is adaptable to conventional vent pipes and is comprised essentially of three main parts, each of which is simple to manufacture. The purification medium is placed in an annular space disposed around the existing vent pipe through which gases escaping therefrom must pass upwardly so that the entire purifying medium is utilized for the purification of the gases without a portion thereof becoming stale and ineffective while other portions of the medium go largely unused. The design of my invention facilitates replacement of the purifying medium and this is true whether, as shown in one embodiment, the purifying medium is a liquid, or as shown in the other embodiment, the purifying element is of a particulate material. Moreover, it will be appreciated that in each instance, the purifying element is so located that undue back pressure is not created in the vent pipe whereby its venting function may be adversely affected.

Other capabilities and advantages of the invention will be appreciated as the description progresses, having reference to the accompanying drawings, in which:

Brief description of the drawings

FIGURE 1 is a longitudinal sectional view of the invention in elevation attached to a vent pipe, and FIGURE 2 is a like sectional view of a further embodiment of the invention.

Description of the preferred embodiments

Referring now to FIGURE 1, it will be noted that the retainer designated generally 5 comprises a cap 6, a cup-shaped container 7, and baffle means 8 which includes an annular space 10 filled with a particulate filter medium 11. Filter medium 11 may be activated charcoal which, for best results, is preferably ground to a mesh within the range of from 7 to 14. Although charcoal is used in the present example, it is to be understood that other filtering or purifying media can be substituted therefor.

At the bottom of the annular space 10 there are a plurality of openings 12 which, however, are sufficiently small to prevent the filter medium 11 from passing therethrough. The cup-shaped container 7 is fastened to the vent pipe 14 below its outlet 15 by a strap 16 or other suitable means. The lower portion of container 7 includes an annular groove 17 which contains an O-ring 20 to provide a hermetic seal between the vent pipe 14 and the container 7. The container 7 at its top carries the baffle means 8 and positions same by further annular groove 21 outwardly from which extends a flange part 22 having a plurality of gas outlets 24 spaced therearound.

The cap 6 turns in slightly at its ends 25 whereby it grips the outer ends of the flange part 22 to form a resilient connection between the cap 6 and the baffle means 8. This connection is augmented by a rod 26 welded or otherwise appropriately secured to the center of the baffle means 8 and extending upwardly therefrom through an opening in the cap 6 where it is threaded and received by a handle 27. The handle 27 is sufficiently large so that the cap 6 together with the baffle means 8 and the purifying medium 11 contained therein can be removed by inserting a long-handled or extensible tool into the handle 27 and lifting thereby the unit comprising baffle means 8 and cap 6 from the container 7. Thus when it is desired to replace the filter medium 11, it is not normally necessary that the individual doing so subject himself to undue danger should the retainer 5 be located on a vent pipe leading from a steep roof or other hazardous area.

Referring now to FIGURE 2, it will be noted that the retainer, designated generally 30, is again comprised essentially of three parts, a cap 31, baffle means 32 and a container 33. In this case, however, the container 33 includes an annular space 35 which, in this embodiment, contains a liquid purifying medium 36. The medium 36 is preferably a cleaner-germicide-deodorizer which will not freeze at the lowest expected temperatures for the geographical area. The medium may be water solutions or emulsions containing phenols or cresols, caustic soda or lime, chlorinated hydrocarbons, pine oil disinfectants, quaternary ammonium salts or soaps, covering or neutralizing aromatics and/or other materials selected from a wide variety of germicides, perfumes and emulsifying agents. For certain applications detergent iodines may be found desirable. It is, however, to be understood that other purifying media can be substituted therefor.

The baffle means 32 is serrated at its bottom 37 and includes a circular protrusion 40 to position it on the upper circular end 41 of the container 33. Below the end 41, a plurality of egress means comprising apertures 42 are disposed around container 33 to permit the escape of gas from the outlet 44 of the vent pipe 45. The container 33 is positioned on the vent pipe 45 by means of an inwardly extending annular ring 46 which contacts the upper edge of the vent pipe 45 at the outlet 44. Further, an outwardly extending annular ring 47 receives an O-ring 50 whereby the container 33 is hermetically sealed on the vent pipe 45. Downwardly extending flanges 51 from the container 33 are provided with openings 52 which may receive wire or other suitable means for further securing the container 33 to the vent pipe 45. A flange portion 54 of the container 33 contains a plurality of gas outlet means comprising apertures 55 to permit the escape of gas from the vent pipe to the atmosphere. A fitting 56 may be optionally connected to the container 33 whereby additional liquid purifying medium can be introduced therein. A float means 57 composed of a light, hollow material includes an indicia part 60 extending from one of the apertures 55. If the liquid purifying medium 36 falls below the serrated lower edge 37 of the baffle means 32, the float means 57 comes to rest at the bottom of the annular space 35 and this circumstance is signalled by the indicia 60.

A rod 61 which is welded or otherwise suitably secured to the top of the baffle means 32 extends upwardly therefrom to a stop 62 which is affixed to rod 61 and thence through an opening in the top of the cap 31 where it is threaded to receive a wing nut 64. The cap 31 turns in somewhat at its periphery 65 so as to be resiliently secured to the flange portion 54. The rod 61 thus constitutes a positioning means to hold the baffle means 32 against the end 41 of the container 33.

In the embodiment shown in FIGURE 1, gas escaping from the vent pipe 14 travels through the outlet 15 and downwardly between the outside of the vent pipe 14 and the baffle means 8 to the openings 12 where it progresses through the filter medium 11 in an upwardly direction until escaping to the atmosphere through the gas outlets 24. Since the escaping gas travels the length of the filter medium 11, all of such medium is placed into effective purification use and the efficiency of the medium is not adversely affected since all vented gas passes therethrough at approximately the same rate.

In the embodiment shown in FIGURE 2, a gas from the vent pipe 45 flows through the outlet 44 and the apertures 42 downwardly between the vent pipe 45 and the baffle means 32 until coming in contact with the liquid purifying medium 36. A small amount of pressure causes the liquid purifying medium 36 to have its level lowered adjacent pipe 45 to the serrated portion 37 of the baffle means wherein the gas bubbles upwardly through the liquid purifying medium contained in the annular space between the outer periphery of the container 33 and the baffle means 32 until received into the cap portion 31 from where it finally escapes through the gas outlet means 55.

In the event that the liquid purifying medium is replenished through the fitting 56, it is preferable that the replenishing medium be introduced through fitting 56 in a foam state and that a sufficient amount be inserted so that it spills over or just about comes up to egress means 42. The foaming should be such that the liquid will eventually settle to approximately the position shown in FIGURE 2. If the liquid is introduced into the fitting 56 in a solid stream, then indicia 60 should be observed so that the flow of the liquid can be terminated when the float means 57 assumes a position as shown in the figure. It is of some importance that the amount of liquid in the annular space 35 on either side of the baffle means 32 not be overly great since otherwise undue back pressure may be created in vent pipe 45. However, the amount should be sufficient to permit an adequate purification of the gas escaping from the vent.

If desired, a particulate or fibrous element may be included in the lower portion of the annular space 35 to promote maximum contact between the medium 36 and the escaping gas. Also, in both embodiments further baffle arrangements as will occur to one skilled in the art may be provided to extend the path of the escaping air through the purifying medium 36. This will be particularly advantageous in areas where a high degree of purification may be required.

Having thus described my invention, what I claim as new and desire to secure by Letters Patent of the United States is:

1. A chemical retainer (5) for a tubular sewer vent pipe which extends from the roof of a building and has its outlet above the roof, said retainer comprising:

a cup-shaped container (7) having a central opening hermetically sealed thereat on said vent pipe below its outlet (15) and including an outer annular wall provided with an upper lip extending above the upper end of said outlet, a first annular space defined between said container and said pipe, an annular-shaped baffle means (8) supported by said container at its lip and including inner and outer spaced, substantially co-axial ring members spaced outwardly of said pipe and defining between them a second annular space (10) which extends into said first annular space, a bottom member of said baffle means joining said ring members, openings (12) in the bottom member of said baffle means leading into said second annular space from said first annular space, a pervious solid purifying substance (11) carried in said second annular space.

a cap (6) connected to and covering said baffle means. and gas outlet means (24) in said baffle means radially outward of said lip to the atmosphere, the sides of said pipe within said container and said ring members being spaced from each other and defining a path from the outlet of said vent pipe to said gas outlet means whereby all gas escaping from said outlet of said vent pipe must first pass downward between said inner ring member and the outside of said vent pipe and then pass upwardly through said purifying substance in said second annular space before it is expelled into the atmosphere from said gas outlet means.

2. A chemical retainer in accordance with claim 1 having handle means (27) connected to said cap and said baffle means wherein said baffle means including said purifying substance is freely liftable from said container.

References Cited

UNITED STATES PATENTS 1,230,473   6/1917   Freeman _____ 4—220
1,383,938   7/1921   Hageman _____ 4—220

(Other references on following page)

| | | UNITED STATES PATENTS | |
|---|---|---|---|
| 1,490,186 | 4/1924 | Rowe | 98—122 |
| 2,171,400 | 8/1939 | Lyon | 55—279 |
| 2,427,525 | 9/1947 | Glanzer | 55—260 |
| 2,493,861 | 1/1950 | Duran. | |
| 2,565,423 | 8/1951 | Evans | 220—44 |
| 2,767,968 | 10/1956 | Buettner | 261—121 |
| 2,784,801 | 3/1957 | Lunde | 220—44 |
| 2,846,021 | 8/1958 | Encinas | 55—387 |
| 3,200,387 | 8/1965 | Loscher | 55—274 |
| 3,248,858 | 5/1966 | Toke | 55—227 |

FOREIGN PATENTS

| | | |
|---|---|---|
| 5,844 | 1907 | Great Britain. |
| 27,947 | 1907 | Great Britain. |
| 302,071 | 12/1928 | Great Britain. |

HARRY B. THORNTON, Primary Examiner

BERNARD NOZICK, Assistant Examiner

U.S. Cl. X.R.

4—218; 55—387, 441, 505; 98—42; 220—44; 261—121, 126